United States Patent
Anticole

[19]

[11] Patent Number: 5,961,101
[45] Date of Patent: Oct. 5, 1999

[54] MODULAR EDGING AND MODULAR INTERCONNECTING FENCING

[76] Inventor: Rose Marie Anticole, 3923 Sunset Blvd., Steubenville, Ohio 43952

[21] Appl. No.: 08/938,655

[22] Filed: Sep. 26, 1997

Related U.S. Application Data

[60] Provisional application No. 60/026,729, Sep. 26, 1996.

[51] Int. Cl.[6] .................................................. E04H 17/16
[52] U.S. Cl. ..................................... 256/24; 256/1; 47/33
[58] Field of Search .............................. 256/1, 24, 25, 256/19, 66, 65; 52/102; 47/33

[56] References Cited

U.S. PATENT DOCUMENTS

| | | | |
|---|---|---|---|
| D. 258,313 | 2/1981 | Morris | D25/2 |
| D. 275,705 | 9/1984 | Gabriel | D25/73 |
| 2,746,723 | 5/1956 | Freeman | 47/33 X |
| 2,877,600 | 3/1959 | Slate | 47/33 |
| 3,378,949 | 4/1968 | Dorris | 47/33 |
| 3,438,146 | 4/1969 | Nickerson | 47/33 |
| 3,529,380 | 9/1970 | Carmichael | 47/33 |
| 3,762,113 | 10/1973 | O'Mullan et al. | 52/102 |
| 3,788,001 | 1/1974 | Balfanz, Jr. | 47/33 |
| 3,933,311 | 1/1976 | Lemelson | 239/276 |
| 4,167,079 | 9/1979 | Reiter | 47/33 |
| 4,543,745 | 10/1985 | Beck | 47/33 |
| 4,647,491 | 3/1987 | Ireland et al. | 428/137 |
| 4,747,231 | 5/1988 | LeMay et al. | 47/33 |
| 5,236,179 | 8/1993 | Schropp | 256/19 |
| 5,317,833 | 6/1994 | Goldman | 47/33 |
| 5,414,956 | 5/1995 | Kheradpir | 47/33 |
| 5,421,118 | 6/1995 | Bauer | 47/33 |
| 5,426,888 | 6/1995 | Gnaedig | 47/33 |
| 5,445,362 | 8/1995 | Reppert | 256/24 |
| 5,456,045 | 10/1995 | Bradley et al. | 47/33 |
| 5,535,545 | 7/1996 | Matz | 47/33 |

*Primary Examiner*—Lynne Reichard
*Assistant Examiner*—David E. Bochna
*Attorney, Agent, or Firm*—Webb Ziesenheim Logsdon Orkin & Hanson, P.C.

[57] ABSTRACT

A modular edging comprises a plurality of sheet panels wherein each of the sheet panels includes a first edge having a first offset and a first double fold along the first edge so that a first gap is defined which is aligned with and facing the panels and a second edge having a second offset and a second double fold along the second edge so that a second gap is defined which is offset from the panel whereby the edges of two adjacent panels may be slid together to form a lock seam joint.

18 Claims, 4 Drawing Sheets

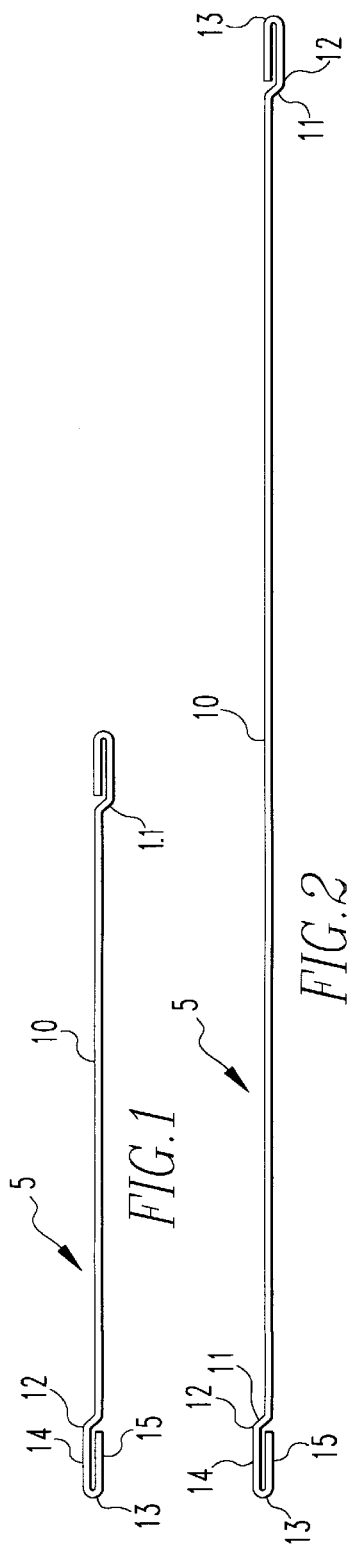
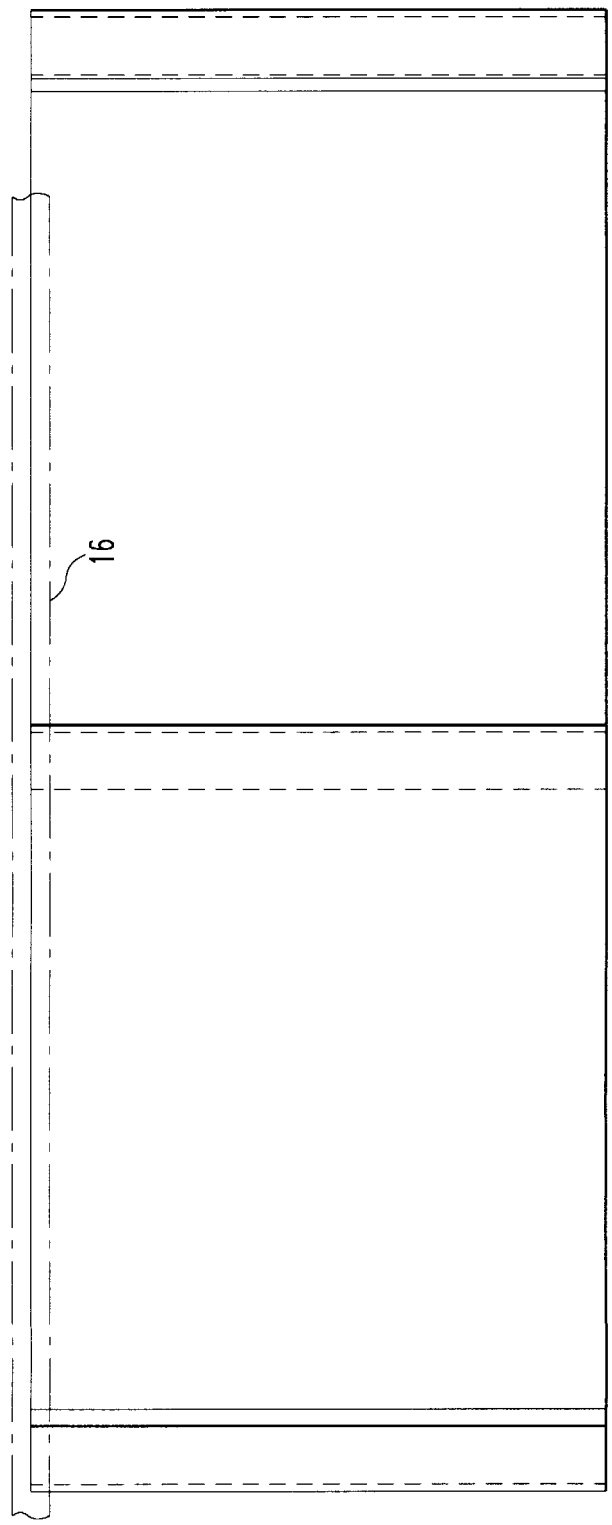

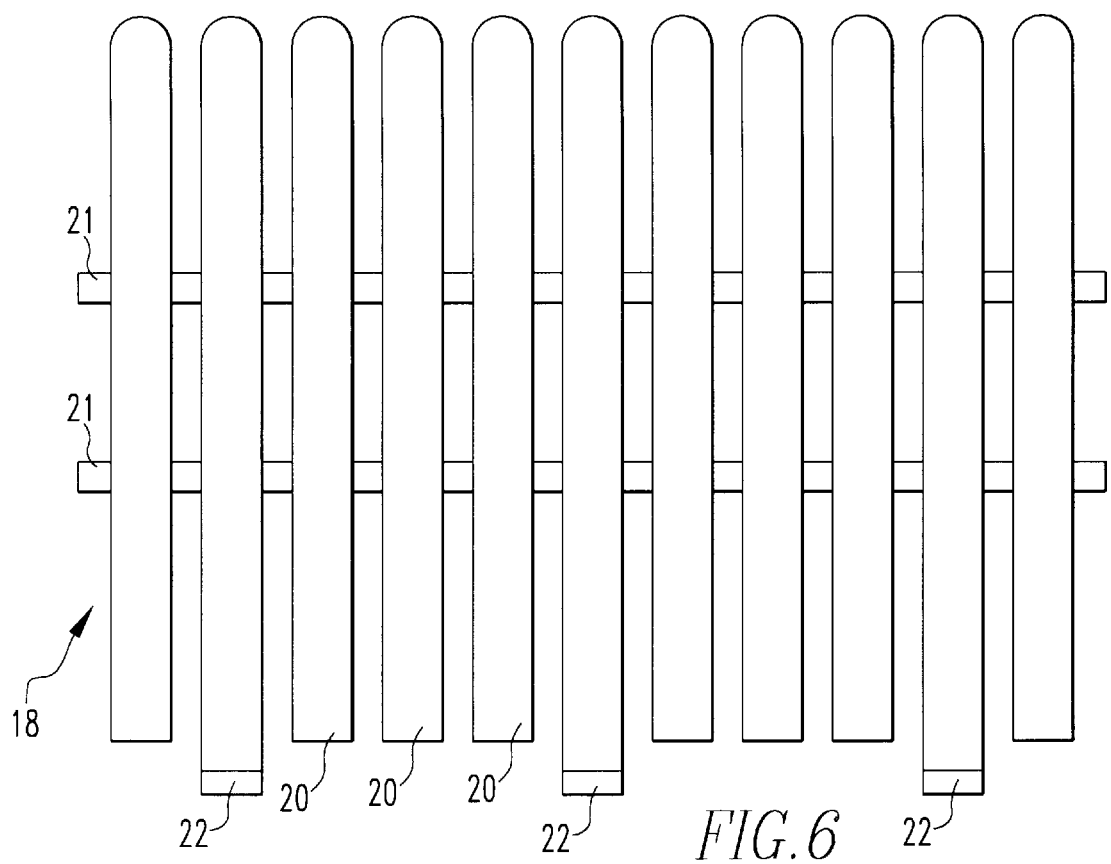
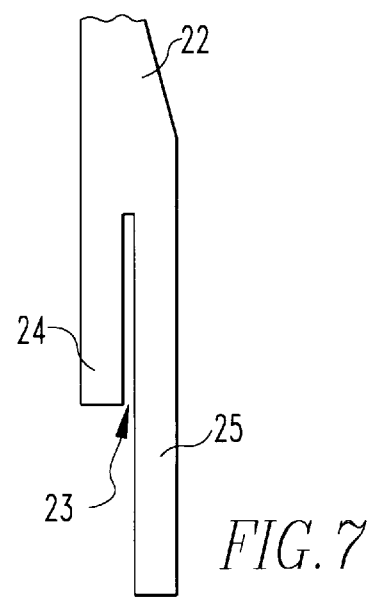

MODULAR EDGING AND MODULAR INTERCONNECTING FENCING

RELATED APPLICATION

This application is related to my Provisional application Ser. No. 60/026,729, filed Sep. 26, 1996 entitled "Modular Edging and Modular Interconnecting Fencing".

BACKGROUND OF THE INVENTION

This invention pertains to a modular landscape edging for gardens or flower beds and a modular decorative fence for interconnecting with the edging.

It is often desirable to provide an edging between flower beds and lawns to keep the grass from encroaching into the flower bed and to maintain a distinct line between them which is pleasing to the eye. Additionally, gardeners often like a low decorative fence along the edge of the flower garden.

Since much gardening is performed as a hobby and very often by women, it is desirable that any edging or decorative fence not require great hand strength.

It is also desirable that no special tools be required for installation.

A combination edging and low decorative fence is especially desirable, since the decorative fence will not show off well with grass growing across the boundary that it is attempting to delineate.

It is an advantage, according to this invention, to provide a modular edging that is easy to install and very effective in maintaining the sharp delineation between flower bed and lawn.

It is a further advantage, according to this invention, to provide a combination modular edging and modular decorative fence that attaches to the edging.

SUMMARY OF THE INVENTION

Briefly, according to this invention, an interlocking landscape edging construction comprises a plurality of sheet panels made of galvanized steel. Along a first edge of each panel is an offset and double fold to define a gap that is aligned with and facing the panel. Along the other edge, there is an offset and double fold that defines a gap offset from the panel whereby the edges of two adjacent panels may be slid together to form a lock seam joint. This interconnection is sometimes referred to as a Pittsburgh lock seam joint. An elongate protective grommet may be provided for enclosing the exposed edge of the assembled edging. Also provided, according to this invention, is a decorative landscape fence and edging construction. A modular molded plastic fence, for example, a picket fence having spaced pickets, is arranged and designed to attach to the installed edging above described. The fence has special pickets or posts having a slot for snugly fitting over the edge of the installed edging. The edging acts as a base or support for the fence.

BRIEF DESCRIPTION OF THE DRAWINGS

FIG. 1 is a top view of a short edging module according to this invention;

FIG. 2 is a top view of a double wide edging module according to this invention;

FIG. 3 is a front view of two short edging modules connected together;

FIGS. 6 and 7 are views of an improved embodiment corresponding to FIGS. 4 and 5.

DESCRIPTION OF THE PREFERRED EMBODIMENTS

Figure 4:
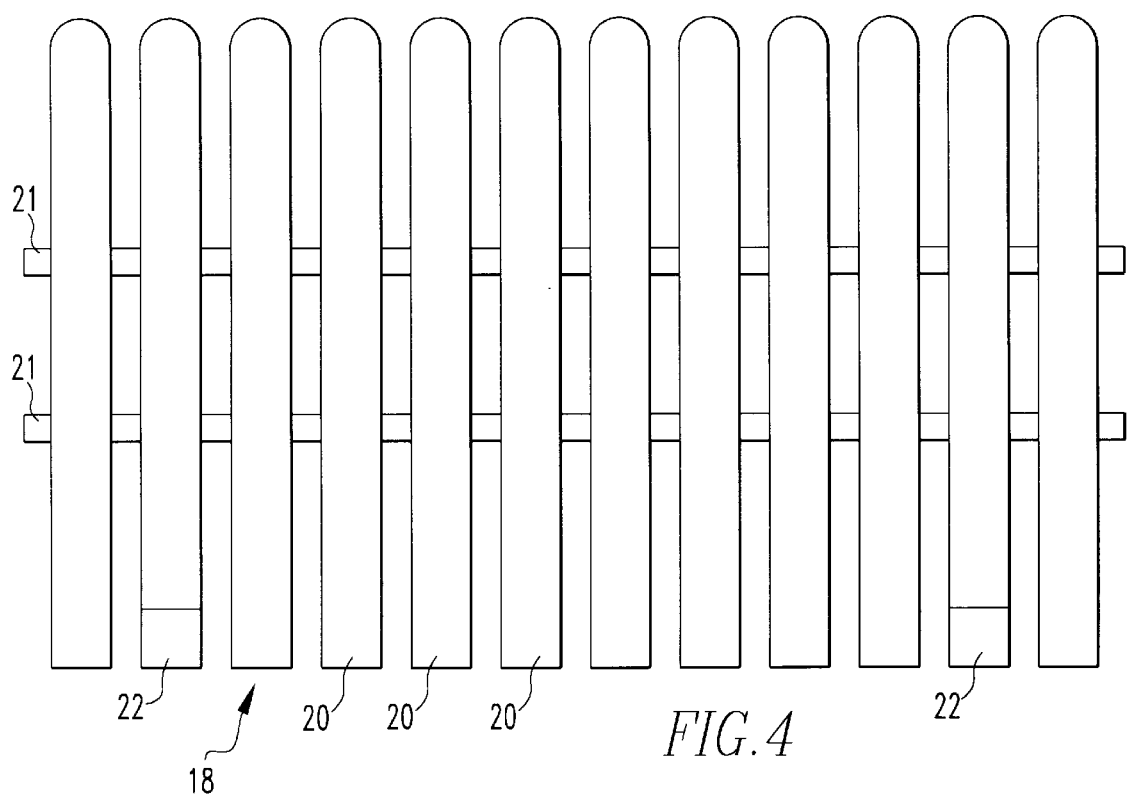
FIG. 4 is a front view of a fence module according to this invention.

Referring to FIGS. 1 and 2, the folded and interlocking edges of the modular edging units 5 are illustrated. The modules 5 comprise a flexible flat panel 10. At each end is an offset 11 and a first bend 12 and a second bend 13 comprising a double bend. The bend 13 is constructed to provide a space between tabs 14 and 15 wide enough to accept the tab 15 of an adjacent module 5. A flexible linear grommet 16 may be inserted over the exposed edge of assembled panels 10. The modules 5 are made from .060 gage galvanized steel which is rust resistant and can be expected to remain in the ground for many years and remain functional. The modular units may be flexed so that a curved edging can be constructed from the modules 5. A packet of modules 5 capable of installing an 8 foot section of edging would weigh approximately 12 pounds where the edging modules 5 are 6½ inches deep and made of .060 gage galvanized steel.

Referring to FIG. 3, two adjacent interlocking module edgings are shown united together.

The edging between a flower bed and the lawn does not require special trenching for installation. The installation is as follows: A first module of edging is driven into the ground approximately halfway. The adjacent module is then interlocked with the piece in the ground and it is pounded halfway into the ground. Next, the first piece is pounded to within ½ inch of the ground where the gardener desires a 1 inch lip. This is a good height because lawnmowers are normally adjusted not to cut grass closer than 1 inch to the ground. It also aids in preventing the grass from encroaching into the flower bed.

Referring to FIG. 4, there is shown a module of decorative fencing 18 according to this invention. The decorative fencing 18 is made of flexible high density polyethylene which will not chip, fade or rust. The fencing 18 is comprised of parallel pickets 20 that are supported by parallel rails 21. Spaced pickets have post attachments 22 that enable connection to the edging that has been placed into the ground.

Figure 5:
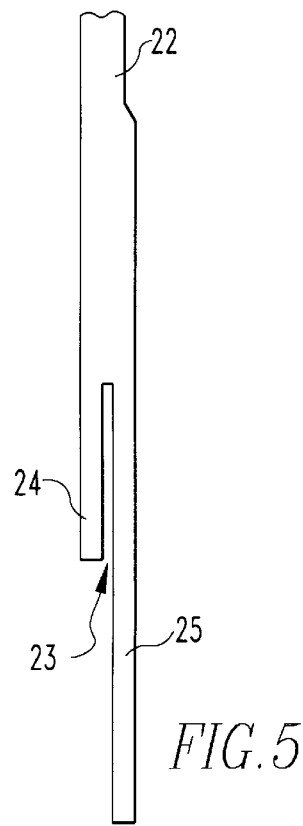
FIG. 5 is a broken away side view of an attachment picket for the fence as shown in FIG. 4 illustrating the slot for snugly fitting over the edging.

Referring to FIG. 5, a side view of an attachment post or picket is illustrated. As shown in FIG. 4, the second and eleventh fence slats have the fence post attachment as an integral part of the fence. These posts are thicker than the remaining posts to provide added strength and to enable the creation of a slot 23 for snugly fitting over the exposed lip of the edging. The front part 24 of the attachment area extends over the edging, wherein it is easily pushed into the ground. There is a back section 25 which is easily pushed into the ground behind the edging that was previously installed.

FIGS. 6 and 7 illustrate an alternate embodiment of a fence section with like elements given like numerals as in FIGS. 4 and 5.

Figure 8:
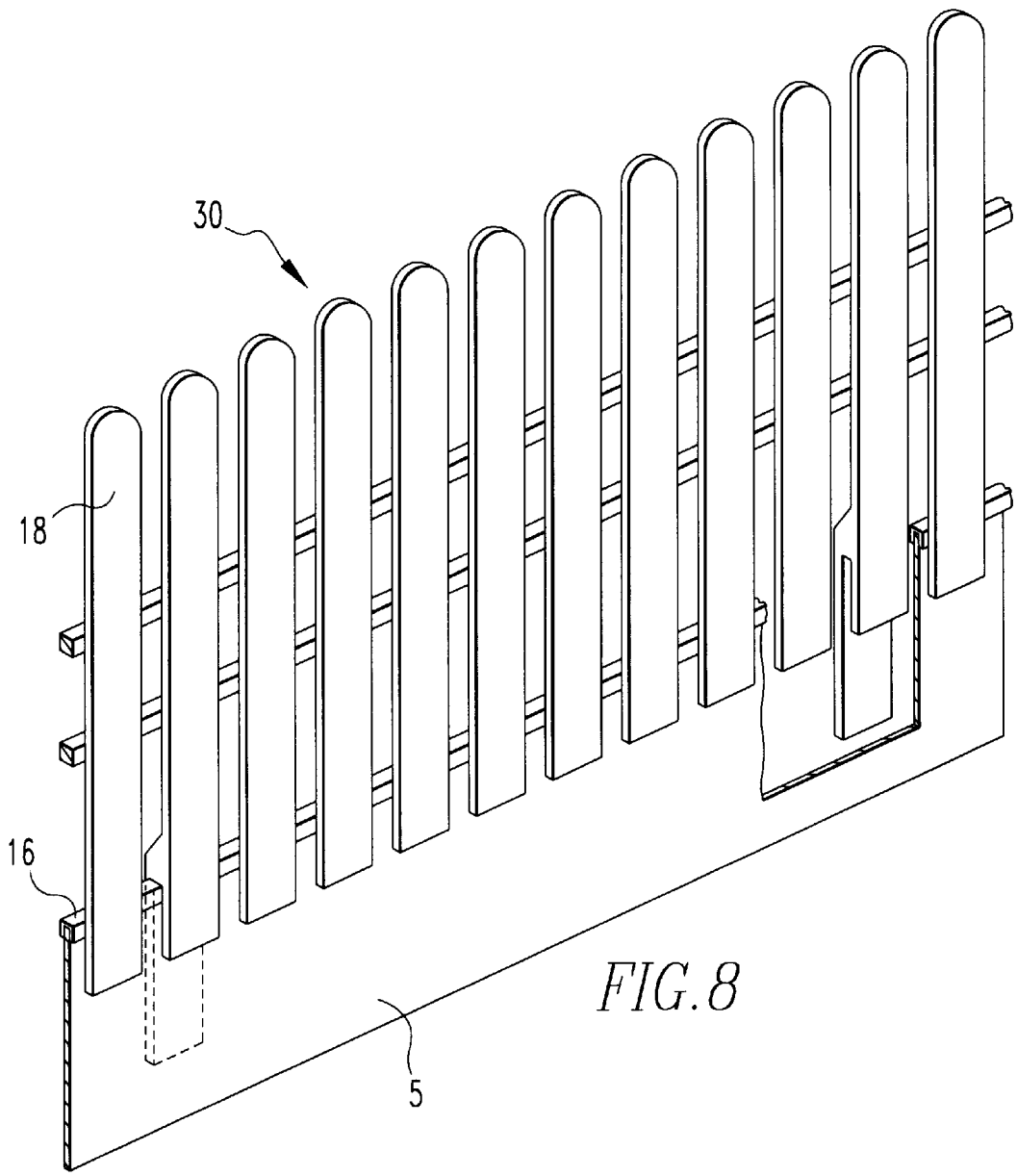
FIG. 8 is a partially broken perspective view of a modular edging and fencing assembly according to this invention.

FIG. 8 shows a modular edging and fencing assembly 30 according to this invention. The modular edging and fencing assembly 30 is a combination of the modular edging 5 and the modular decorative fencing 18 which attaches to the modular edging 5.

The fencing 18 can be easily removed from the edging during garden work.

Having thus described my invention with the detail and particularity required by the Patent Laws, what is desired protected by Letters Patent is set forth in the following claims.

I claim:

1. A modular edging and fencing assembly, comprising:
    a plurality of sheet panels, wherein each of said sheet panels includes:
        a first edge having a first offset and a first double fold along said first edge so that a first gap is defined which is aligned with and facing the panels; and
        a second edge having a second offset and a second double fold along said second edge so that a second gap is defined which is offset from the panel, whereby the edges of two adjacent panels may be slid together to form a lock seam joint; and
    a module of decorative fencing removably connected to at least one of said sheet panels,
    wherein the module of decorative fencing includes a plurality of fence slats, and wherein each fence slat is attached to a plurality of supports.

2. The modular edging and fencing assembly as described in claim 1, wherein the sheet panels are made of galvanized steel.

3. The modular edging and fencing assembly as described in claim 1, wherein the sheet panels are flexible so that the modular edging may be curved.

4. The modular edging and fencing assembly as described in claim 1, further comprising an elongate protective grommet for enclosing the exposed edge of the modular edging.

5. A method for edging a flower garden with the modular edging and fencing assembly as described in claim 1, comprising the steps of:
    (a) driving a first edging element halfway into the ground;
    (b) interlocking a next edging element to the last halfway driven edging element;
    (c) driving said next edging element halfway into the ground;
    (d) driving the first halfway driven edging element further into the ground;
    (e) repeating the steps (b) through (d) until the flower garden is edged considering the next edging element as the first; and
    (f) attaching a module of decorative fencing to at least one of the edging elements,
    wherein the module of decorative fencing is removably connected to the at least one edging element, and
    wherein in step (d) the previous halfway driven edging element is driven further into the ground such that it extends approximately ½ inch above the ground.

6. The method according to claim 5, comprising further the step of:
    (g) enclosing an exposed edge of the edging with a guard.

7. The method according to claim 5, comprising further the step of adjusting each new edging element to the contour of the edge of a flower garden.

8. The modular edging and fencing assembly as described in claim 1, wherein the module of decorative fencing is made of a flexible material so that the module of decorative fencing may be curved.

9. The module edging and fencing assembly as described in claim 1, wherein the module of decorative fencing is made of high density polyethylene.

10. The modular edging and fencing assembly as described in claim 1, wherein the supports are substantially parallel rails and the fence slats are positioned substantially transverse to the rails.

11. A modular edging and modular interconnecting fencing comprising:
    a plurality of sheet panels, wherein each of said sheet panels includes:
    a first edge having a first offset and a first double fold along said first edge so that a first gap is defined which is aligned with and facing the panel;
    a second edge having a second offset and a second double fold along said second edge so that a second gap is defined which is offset from the panel, whereby the edges of the two adjacent panels may be slid together to form a lock seam joint; and
    a plurality of fence slats, wherein each fence slat is attached to a plurality of supports so that a module of modular fencing is formed, and wherein two or more fence slats are provided with a slot at the bottom which fits over the edging to attach the fencing to the edging.

12. The modular edging and modular interconnecting fencing as described in claim 11, wherein the sheet panels are made of galvanized steel.

13. The modular edging and modular interconnecting fencing as described in claim 11, wherein the sheet panels and fencing are flexible so that the modular edging and modular interconnecting fencing may be curved.

14. The modular edging and modular interconnecting fencing as described in claim 11, further comprising an elongate protective grommet for enclosing the exposed edge of the edging.

15. The modular edging and modular interconnecting fencing as described in claim 11, wherein the fencing is made of plastic.

16. The modular edging and modular interconnecting fencing as described in claim 11, wherein the fence slats having a slot at the bottom may be thicker than the fence slats not having a slot at the bottom.

17. The modular edging and modular interconnecting fencing as described in claim 11, wherein said slot is formed by a front leg and a back leg, the front leg being shorter than the back leg, and wherein the legs are pushed into the ground.

18. A method for building a decorative fence out of edging elements and fencing elements as described in claim 11 in a flower garden, comprising the steps of:
    (a) edging the flower garden with edging elements;
    (b) positioning a fencing element above said edging;
    (c) slidably securing said fencing element to the edging; and
    (d) repeating the steps (b) through (c) until the flower garden is fenced.

* * * * *